United States Patent [19]
Janik et al.

[11] Patent Number: 4,584,361
[45] Date of Patent: Apr. 22, 1986

[54] STORAGE STABLE, ONE PART POLYORGANOSILOXANE COMPOSITIONS

[75] Inventors: Gloria Janik; Peter Y. K. Lo, both of Midland, Mich.

[73] Assignee: Dow Corning Corporation, Midland, Mich.

[21] Appl. No.: 756,208

[22] Filed: Jul. 18, 1985

Related U.S. Application Data

[63] Continuation-in-part of Ser. No. 740,786, Jun. 3, 1985, abandoned.

[51] Int. Cl.$^4$ .............................................. C08G 77/06
[52] U.S. Cl. ........................................ 528/15; 528/31; 528/32; 525/478
[58] Field of Search .......................... 528/15, 31, 32; 525/478

[56] References Cited

U.S. PATENT DOCUMENTS

| | | | |
|---|---|---|---|
| 3,188,299 | 6/1965 | Chalk | 260/46.5 |
| 3,723,567 | 3/1973 | Mink et al. | 260/825 |
| 3,992,355 | 11/1976 | Itoh et al. | 260/46.5 |
| 4,281,093 | 7/1981 | Garden | 528/15 |
| 4,374,967 | 2/1983 | Brown et al. | 528/31 |

FOREIGN PATENT DOCUMENTS

| | | |
|---|---|---|
| 1309299 | 3/1973 | United Kingdom . |
| 1432339 | 4/1976 | United Kingdom . |
| 1540760 | 2/1979 | United Kingdom . |

*Primary Examiner*—Melvyn I. Marquis
*Attorney, Agent, or Firm*—Robert Spector

[57] ABSTRACT

A specified group of monoalkylamines and alkylenediamines wherein the alkyl or alkylene group contains from two to four carbon atoms imparts long term storage stability at temperatures of up to 40° C. to one part polyorganosiloxane compositions curable by a platinum catalyzed hydrosilation reaction. The inhibitors do not interfere with the ability of these compositions to cure rapidly at temperatures of 135° C. to form gels that are useful encapsulating materials for delicate devices, including electronic circuits.

9 Claims, No Drawings

STORAGE STABLE, ONE PART POLYORGANOSILOXANE COMPOSITIONS

REFERENCE TO RELATED APPLICATIONS

This application is a continuation-in-part of our co-pending application Ser. No. 740,786, filed on June 3, 1985 now abandoned.

BACKGROUND OF THE INVENTION

1. Field of the Invention

This invention relates to storage stable polyorganosiloxane compositions. More particularly, this invention relates to one part polyorganosiloxane compositions curable by a platinum catalyzed hydrosilation reaction. The compositions contain a catalyst inhibitor that imparts long term storage stability at 50° C., yet allows the compositions to cure rapidly to a gel at temperatures of about 135° C. and above.

2. Description of the Prior Art

Polyorganosiloxane compositions which cure by means of a platinum catalyzed hydrosilation reaction to form silicone gels are disclosed, for example, in U.S. Pat. Nos. 3,020,260, issued to Nelson on Feb. 6, 1962, and in 4,374,967, issued to Brown, Lee and Maxson on Feb. 22, 1983. The gels described by Nelson are obtained by reacting an organosiloxane containing two silicon-bonded hydrogen atoms per molecule with a vinyl-containing copolymer wherein the repeating units are of the formulae $RViSiO$, $R_2SiO$, and $CH_3R_2SiO_{0.5}$, where R is methyl or phenyl and Vi represents vinyl. The vinyl-containing copolymers disclosed by Brown et al. consist essentially of $(CH_3)_2SiO$, $(CH_3)_3SiO_{0.5}$ and $(CH_3)_2ViSiO_{0.5}$, where Vi again represents vinyl, and are reacted with an organohydrogensiloxane having more than one silicon-bonded hydrogen atom per molecule. Brown et al. teach that known inhibitors for platinum catalyzed hydrosilation reactions can be added to increase the working time of catalyzed compositions by decreasing the rate at which these compositions cure at temperatures above about 100° C. While known inhibitors will partially suppress the reactivity of catalyzed compositions containing both vinyl radicals and silicon-bonded hydrogen atoms, these compositions cannot be stored for extended time periods under ambient conditions without either undergoing a substantial increase in viscosity or curing to form a solid gel. A commercially useful one-part composition should not vary more than about 10% in viscosity during the period of several weeks that can elapse between the time the composition is prepared and the time at which it is desired to cure the composition. During this period the compositions are stored in locations where the ambient temperature may reach 40° C.

Until now, it has not been feasible to prepare one-part compositions of the type described in the aforementioned Nelson and Brown et al. patents that meet the foregoing stability requirements for commercially useful materials. Inhibitors that have been disclosed as useful catalyst inhibitors for the compositions taught in the aforementioned Brown et al. patent include the aromatic hetrocyclic nitrogen compounds, pyridazine, pyrazine, quinoline, 2,2'-biquinoline, bipyridine, naphthyridine, quinaldine, dialkyl formamides, thioamides, alkylthioureas and ethylene thiourea described in U.S. Pat. No. 3,188,299, issued June 8, 1965, the organophosphorus compounds as described in U.S. Pat. No. 3,188,300, issued June 8, 1965, benzotriazole as described in U.S. Pat. No. 3,192,181, issued June 29, 1965, the nitrile compounds as described in U.S. Pat. No. 3,344,111, issued Sept. 26, 1967, the halocarbons described in U.S. Pat. No. 3,383,356, issued May 14, 1968, the acetylenic compounds described in U.S. Pat. No. 3,445,420, issued May 20, 1969, the vinyl silazanes described in U.S. Pat. No. 3,453,233, issued July 1, 1969, the sulfoxide compounds described in U.S. Pat. No. 3,453,234, issued July 1, 1969, the stannous salts, mercuric salts and other salts described in U.S. Pat. No. 3,532,649, issued Oct. 6, 1970 and the cyclic polymethylvinylsiloxanes discussed in U.S. Pat. No. 3,923,705, issued Dec. 2, 1975.

The use of ammonia, amines, and other nitrogen-containing compounds as inhibitors for the platinum catalyzed reaction of silicon-bonded hydrogen atoms with silicon-bonded hydroxyl groups is taught in U.S. Pat. No. 3,867,343, issued to Garden on Feb. 18, 1975. U.S. Pat. No. 4,281,093, issued to Garden on July 28, 1981, discloses using these inhibitors for the reaction of SiH-containing polyorganosiloxanes with polyorganosiloxanes containing silicon-bonded hydroxyl, vinyl or allyl groups. The catalysts for the reaction are organometallic complexes of platinum or rhodium.

The longest gel time, i.e., time required for gelling of the reaction mixture at 25° C., reported in U.S. Pat. No. 3,867,343 is 2409 minutes, equivalent to 40.15 hours, and is obtained using alpha-dipyridyl. This value does not take into account the increase in viscosity that typically occurs prior to complete gelation. The viscosity increase could render the composition unsuitable for commercial use as a one-part composition considerably prior to the time gelation occurred. N,N,N',N'-tetramethylethylenediamine was considerably less effective as an inhibitor than alpha-dipyridyl, imparting a gel time of 1533 minutes (25.5 hours). The data in U.S. Pat. No. 3,867,343 would not encourage the evaluation of amines and other nitrogen compounds disclosed therein as catalyst inhibitors for one-part platinum catalyzed polyorganosiloxane compositions that must remain stable for several weeks at 50° C. prior to being cured, and which cure to a gel in less than 60 minutes at 135° C. Preferred compositions cure in less than 20 minutes and are stable for several months at 50° C.

SUMAMRY OF THE INVENTION

The present invention is based on the discovery that two of the multitude of nitrogen compounds disclosed in the aforementioned U.S. Pat. No. 3,867,343 and a small group of structurally related amines are unique in imparting long term storage stability to polyorganosiloxane compositions of the type disclosed in the aforementioned U.S. Pat. No. 4,374,967 to Brown et al.

DETAILED DESCRIPTION OF THE INVENTION

This invention provides a storage stable, heat curable one-part polyorganosiloxane composition consisting essentially of the product obtained by blending (1) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units; (2) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen per silicon-bonded vinyl radical present in said composition, (3) a platinum catalyst in an amount sufficient to promote the reaction of (1) and (2) in the absence of an inhibitor, and (4) a platinum catalyst inhibitor, said composition being characterized by the presence of a platinum catalyst inhibitor of the general formula $R_2{}^1NR^3NR_2{}^2$ or $R^4NH_2$ in an amount sufficient to impart long term storage stability to said composition at 40° C. without inhibiting the catalytic activity of (3) at 135° C., where each $R^1$ is individually selected from the group consisting of alkyl radicals containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms.

The feature that distinguishes the present compositions from those of the prior art and in particular the compositions disclosed in the aforementioned U.S. Pat. No. 4,374,967 to Brown et al. is a unique group of alkylene diamines and monoalkylamines that suppresses the activity of the catalyst under typical storage conditions sufficiently to impart long term stability to the composition without inhibiting curing at 135° C.

The inhibitors of this invention exhibit the general formulae $R_2{}^1NR^3NR_2{}^2$ and $R^4NH_2$ where $R^1$, $R^2$, $R_3$, and $R^4$ are as defined hereinbefore. Preferably all of the $R^1$ and $R^2$ radicals are methyl, $R^3$ is ethylene and the inhibitor is N,N,N',N'-tetramethylethylenediamine. Using this preferred inhibitor, cure times of 20 minutes or less are achieved at 135° C. and the compositions are stable for several months at 50° C. Other amines corresponding to the foregoing general formulae, such as 3-(N,N-dibutylamino)-propylamine and n-butylamine have been shown by applicants to impart useful storage stability to the compositions of this invention, but sometimes to a lesser degree than the preferred inhibitor.

The concentration of inhibitor will affect the long-term storage stability of the composition and the time required to cure the composition at 135° C. Concentrations as low as 0.001 part by weight per 100 parts by weight of total composition are useful when the storage period is relatively short and a rapid cure is desired. As the inhibitor concentration is increased to a limit of about 1.0 part per 100 parts of composition, storage stability under ambient conditions improves with a corresponding increase in the time required for the composition to cure. The concentration of a specific inhibitor that will satisfy the requirements for a particular end use application can readily be determined with a minimum of experimentation. The concentration range for the present inhibitors is preferably from 0.003 up to 0.01 part by weight per 100 parts by weight of total composition.

Applicants have discovered that the amine inhibitors described hereinbefore are quite selective, and are effective only in combination with a relatively small class of polyorganosiloxane compositions. This class includes some of the compositions described in the aforementioned U.S. Pat. No. 4,374,967 to Brown et al., issued on Feb. 22, 1983. The compositions of Brown et al. that can be stabilized using the present inhibitors consist essentially of (1) an organosiloxane copolymer consisting essentially of from 80 to 96.5 mol % of $(CH_3)_2SiO$ units, from 2.0 to 10.0 mol % of $CH_3SiO_{1.5}$ units, from 1.25 to 6.0 mol % of $(CH_3)_3SiO_{0.5}$ units and from 0.25 to 4.0 mol % of $(CH_3)_2(CH_2=CH)SiO_{0.5}$ units, and (2) an organohydrogensiloxane containing an average of two silicon-bonded hydrogen atoms per molecule, no more than one hydrogen atom on any silicon atom and organic radicals selected from alkyl containing from 1 to 6 carbon atoms, phenyl and 3,3,3-trifluoropropyl. The concentration of organohydrogensiloxane is sufficient to provide from 0.7 to 1.2 silicon-bonded hydrogen atoms per vinyl radical present in polyorganosiloxane (1). The composition also contains an amount of a platinum catalyst sufficient to promote the reaction of (1) and (2) in the absence of the inhibitor.

Vinyl-containing organosiloxane copolymers corresponding to (1) are well known. Preparation of these copolymers is described in the examples of the aforementioned Brown et al. patent, which is incorporated herein in its entirety by reference as a teaching of vinyl-containing organosiloxane copolymers suitable for use in the present compositions. These copolymers can be prepared by cohydrolysis of the corresponding methylchlorosilanes in the presence of a suitable acid acceptor. The resultant mixture can then be reacted with the required amount of $(CH_3)_2(CH_2=CH)SiCl$ or a hydrolysis product thereof to form the polyorganosiloxane referred to as (1) Alternatively, ingredient (1) can be prepared by equilibration of the corresponding siloxane polymers in the presence of an equilibration catalyst such as potassium silanolate. This alternative method is usually the preferred one.

Preferred organosiloxane copolymers contain from 87 to 94 mol percent of dimethylsiloxane units, from 3 to 6 mol percent monomethylsiloxy units, from 2.5 to 5 mol percent of trimethylsiloxy units and from 0.5 to 1 mol percent of dimethylvinylsiloxy units.

In the presence of a platinum hydrosilation catalyst, the vinyl radicals in (1) will react with the organohydrogensiloxane (2) to form a cured gel-like material. Ingredient (2) contains at least two silicon-bonded hydrogen atoms per molecule that can be located on any of the silicon atoms of (2). If only two silicon-bonded hydrogen atoms are present, they are preferably located at the terminal silicon atoms of a polydiorganosiloxane. The organic radicals present on (2) can be one or more of alkyl containing from one to six carbons, phenyl or 3,3,3-trifluoropropyl. To ensure compatibility of (2) with the remaining ingredients of the present composition, the organic radicals are preferably methyl.

Preferred embodiments of ingredient (2) can include one or more methylhydrogensiloxane and/or dimethylhydrogensiloxy units in combination with trimethylsiloxy, $CH_3SiO_{1.5}$, dimethylsiloxane and/or $SiO_2$ units. One preferred embodiment of (2) is a dimethylhydrogensiloxy endblocked polydimethylsiloxane containing from 1 to 30 dimethylsiloxane units per molecule. A second preferred embodiment contains trimethylsiloxy, dimethylsiloxane and methylhydrogensiloxane units, and an average of from 4 to 20 silicon atoms per molecule.

The concentration of (2) is sufficient to provide from 0.7 to 1.2 silicon-bonded hydrogen atoms per vinyl radical present in (1). Below this range there are an insufficient number of hydrogen atoms to completely cure the composition, while above this range hydrogen gas may be generated during curing and/or storage of the composition.

The platinum catalyst employed in the present invention includes all of the well-known platinum catalysts that are effective for catalyzing the reaction between silicon-bonded hydrogen and vinyl groups. These materials include the chloroplatinic acid catalyst described in U.S. Pat. No. 2,823,218, issued Feb. 11, 1958, to Speier et al., and the reaction products of chloroplatinic acid and an organosilicon compound such as those described by Willing in U.S. Pat. No. 3,419,593, issued Dec. 31, 1968. Also applicable are the platinum hydrocarbon complexes shown in U.S. Pat. Nos. 3,159,601, issued Dec. 1, 1964 and 3,159,662, issued Dec. 1, 1964, both to Ashby, the platinum acetylacetonate shown in U.S. Pat. No. 3,723,497, issued Mar. 27, 1973 to Baney and the platinum alcoholate catalysts described by Lamoreaux in U.S. Pat. No. 3,220,972, issued Nov. 30, 1965.

For any particular platinum catalyst selected, the skilled practitioner will be able to readily determine an optimum amount to promote curing. Platinum catalysts have been used effectively in amounts sufficient to provide from about 0.1 to 40 parts by weight of platinum per million parts by weight of total formulation. We have found the particular platinum catalyst described in Example 1 of the patent to Willing, supra, to be particularly effective when employed so as to provide between 5 and 10 parts by weight of platinum per million parts by weight of the total formulation.

The compositions of this invention are typically prepared by blending the foregoing ingredients (1) and (2) together with the platinum catalyst and the catalyst inhibitor to form a homogeneous composition. The inhibitor allows the composition to be stored under ambient conditions for a period of several days up to several months, depending upon the type and concentration of inhibitor. When it is desired to cure a composition, it is heated at a temperature of about 135° C. or above until the desired degree of curing has been achieved. The degree of curing is conveniently determined by measuring the distance which a penetrometer probe of known weight penetrates into the gel during a specified period of time. For preferred cured compositions this value is from 3 to 7.5 mm. using a combined probe and plunger weight of 19.5 g. applied for five seconds. Compositions containing the preferred inhibitor, N,N,N',N'-tetramethylethylenediamine, cure in 20 minutes or less at 135° C. and will cure at temperatures as low as 80° C.

A characteristic feature of at least some of the present compositions is the occurrence of a relatively small increase in viscosity during the first seven days of storage. The total increase amounts to about 10 percent of the initial viscosity. Following this initial increase the viscosity of the composition remains substantially constant throughout the remainder of the storage period, which can be up to ten months or longer.

The gels obtained by curing the polyorganosiloxane compositions of this invention are useful as potting compounds and conformal coatings. The compositions are particularly useful for encapsulating electronic circuits containing semiconductor devices that are susceptible to damage by moisture or other contaminants present at locations where the circuits are installed. The structural integrity of the gel is not adversely affected by temperatures as low as $-120°$ C.

The following examples demonstrate the uniqueness of representative catalyst inhibitors with respect to their chemical composition and the polyorganosiloxane materials that can be stabilized using these inhibitors. All parts and percentages are by weight unless otherwise specified.

EXAMPLE 1

A number of amines were evaluated as inhibitors by blending them together with a polyorganosiloxane composition consisting essentially of 95.2 parts of an organosiloxane copolymer containing 92.8 weight percent dimethylsiloxane units, 1.1 weight percent dimethylvinylsiloxane units, 2.6 weight percent trimethylsiloxy units, 3.6 weight percent monomethylsiloxy units, and exhibiting a viscosity of $1 \times 10^5$ m$^2$/s at 25° C.; 4.6 parts of a dimethylhydrogensiloxy endblocked polydimethylsiloxane containing about 0.2 percent by weight of silicon-bonded hydrogen atoms (equivalent to a SiH/vinyl molar ratio of 0.85/1), and 0.2 part of a reaction product of chloroplatinic acid and sym-tetramethyldivinyldisiloxane, the reaction product having been diluted with an amount of a liquid dimethylvinylsiloxy endblocked polydimethylsiloxane sufficient to provide a platinum content of 0.7 weight percent.

The storage stability of each composition was determined by measuring the viscosity of the initial composition and repeating the measurement at intervals of about seven days, during which time the compositions remained under atmospheric pressure and a temperature of 25 or 38° C. The viscosities were measured using a Brookfield model LVT viscometer equipped with a number 3 spindle.

The cure time of the compositions was determined using a Tecam Gelation Timer (manufactured by Techne Ltd., Cambridge, England). A 100g. sample of the composition was placed in a container maintained at a temperature of 135° C. by immersion in an oil bath. The timer was equipped with a stainless steel plunger that was immersed in the composition. The plunger consisted of a circular 2.2 cm.-diameter plate with a 10.2 cm.$\times$0.3 cm. diameter stem affixed to its center. The plunger weighed 6.2 g. and was oscillated mechanically in a vertical direction with an amplitude of 1.3 cm. and a frequency of 1 cycle per minute. When the composition gelled, the motion of the plunger was restricted, causing the timer to cease functioning. The operating time of the timer was then read from the instrument and recorded.

The penetration values reported in this example and those which follow it were determined using a Precision Penetrometer (manufactured by Precision Scientific) equipped with a 4.5 g. probe attached to a 15 g. plunger. The penetration of the probe into a sample that had been cured for ½ hour at a temperature of 150° C. was determined by allowing the probe to penetrate under its own weight into the sample for five seconds. The gauge on the penetrometer indicated how far the probe penetrated into the sample during the five second time interval.

| Inhibitor | Wt. % | Result |
|---|---|---|
| Pyridine (control) | 0.0067* 0.16 0.5 | Samples cured in less than one hour at room temperature |

| Inhibitor | Wt. % | Result |
|---|---|---|
| Triethylamine (control) | 0.004* 0.048 0.30 | Samples cured in less than one hour at room temperature |
| Diethylenetriamine (control) | 0.0015* 0.003 0.00012 | Samples did not cure during 60 minutes at 135° C. |
| Ethylenediamine (control) | 0.0005 0.003* 0.001 | Sample cured in two days at 38° C. Sample did not cure in 60 minutes @ 135° C. Sample did not cure in 60 minutes @ 135° C. |
| N,N—dibutylaminopropylamine (present invention) | 0.003* 0.05 | Cured in 2 hours at room temperature Cured in 11.8 minutes at 135° C.; no change in viscosity after 22 days at room temperature. After aging 22 days at temperature, sample cured in 49 minutes at 135° C. |
| n-Butylamine (present invention) | 0.003* 0.04 | Cured in 3 hours at room temperature. Viscosity increased from 0.8 to 0.9 Pa.s during 22 days at room temperature. Initial sample cured in 7.9 minutes @ 135° C.; cure time increased to 51.3 minutes @ 135° C. after 22 days at room temperature. |
| n-Butylamine** | 0.06 | No change in viscosity during 22 day storage at room temperature. Initial sample cured in 21.7 minutes @ 135° C.; After 22 days at room temperature, sample did not cure in 60 minutes @ 135° C. |
| N,N,N',N'—tetramethylethylenediamine (present invention) | 0.0034 0.005* | 10% viscosity increase over 98 days at room temperature; cured in 12 minutes at 135° C., penetration = 3.8 mm mm No viscosity increase over 61 days at room temperature; initial and aged samples cured in 12 minutes at 135° C., penetration = 5 mm. |

Percentage values followed by asterisk (*) represent values equal to a ratio of 11 nitrogen atoms present in the amine per 1 platinum atom in the catalyst.
** - Included for purposes of comparison. Concentration of inhibitor is above the level at which it will allow curing in 60 minutes at 135° C. following storage.

The data in the foregoing table demonstrate that of the seven amines evaluated, only three, N,N-dibutylaminopropylamine, N,N,N',N'-tetramethylethylenediamine and n-butylamine, were effective inhibitors in that at one or more concentration levels they allowed the composition to be stored for several days at room temperature with at most a 10% increase in viscosity and without adversely affecting the ability of the composition to cure relatively rapidly, i.e., in sixty minutes or less, at a temperature of 135° C. The data also show that at a level of 0.06 percent t-butylamine does not permit the composition to cure in 60 minutes at 135° C.

EXAMPLE 2

This example demonstrates the inability of a preferred inhibitor of this invention to stabilize a one part silica reinforced polyorganosiloxane elastomer composition containing a vinyl terminated polydimethylsiloxane, an organohydrogensiloxane containing an average of five silicon-bonded hydrogen atoms per molecule and a platinum catalyst in addition to a fume silica filler. The composition was prepared by combining the following ingredients to form a homogeneous mixture:

188 parts of a dimethylvinylsiloxy endblocked polydimethylsiloxane exhibiting a viscosity of 2 Pa.s at 25° C.;
8.9 parts of hexamethyldisilazane
2.8 parts of distilled water
0.13 part of the platinum catalyst described in Example 1 hereinbefore
35.8 parts of fume silica
12 parts of a trimethylsiloxy endblocked dimethylsiloxane/methylhydrogensiloxane copolymer containing an average of five methylhydrogensiloxane units and three dimethylsiloxane units per molecule,
0.4 part of a cyclic polymethylvinylsiloxane
0.005%, based on the total weight of the foregoing composition, of N,N,N',N'-tetramethylethylenediamine.

The resultant composition was allowed to stand at room temperature for eighteen hours, during which time it cured to a solid elastomer. This demonstrates that the present inhibitors are selective with respect to the types of platinum catalyzed compositions to which they will impart long term storage stability at ambient temperature.

EXAMPLE 3

This example demonstrates the temperature range over which preferred platinum catalyst inhibitors of this invention impart storage stability to polyorganosiloxane compositions. Each of the compositions were prepared as described in the preceding Example 1 using the same types and amounts of organosiloxane copolymer, dimethylhydrogensiloxy endblocked polydimethylsiloxane and platinum catalyst. The storage stability of composition A at 50° and 70° and the storage stability of compositions B and C at 38° and 70° were determined by viscosity measurements as described in the preceding Example 1. The type and amount of inhibitor and the results of these evaluations are summarized in the following table.

| Composition A (0.005% N,N,N"N"—tetramethylethylenediamine) | | |
|---|---|---|
| Exposure Time | Viscosity (Pa.s) | |
| (Days) | 50° C. | 70° C. |
| 0 | 0.75 | 1.06 |
| 1 | 0.76 | 0.97 |
| 8 | 0.81 | 0.96 |
| 138 | 0.74 | 1.76 |

-continued

| Composition B (0.04% n-butylamine) | | |
|---|---|---|
| Exposure Time | Viscosity (Pa.s) | |
| (Days) | 38° C. | 70° C. |
| 6 | 0.84 | 7.6 |
| 15 | 0.84 | cured (after 12 days) |

| Composition C (0.05% N,N—dibutylaminopropylamine) | | |
|---|---|---|
| Exposure Time | Viscosity (Pa.s) | |
| (Days) | 38° C. | 70° C. |
| 3 | 0.67 | — |
| 6 | — | 0.48 |
| 9 | 0.65 | — |
| 12 | — | 0.46 |

These data demonstrate that all of the compositions were still relatively low viscosity liquids after at least 12 days at 38° C. The preferred inhibitor imparted a storage stability of 138 days at 70° C.

That which is claimed is:

1. A storage stable, heat curable one-part polyorganosiloxane composition consisting essentially of the product obtained by mixing
   (1) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units;
   (2) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogens per silicon-bonded vinyl radical present in said composition;
   (3) a platinum catalyst in an amount sufficient to promote the reaction of (1) and (2) in the absence of an inhibitor; and
   (4) a platinum catalyst inhibitor, said composition being characterized by the presence of a platinum catalyst inhibitor of the general formula $R_2^1NR^3NR_2^2$ or $R^4NH_2$ in an amount sufficient to impart long term storage stability to said compositions at 40° C. without inhibiting the catalytic activity of (3) at 135° C., where each $R^1$ is individually an alkyl radical containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms.

2. A composition according to claim 1 where all the $R^1$ radicals are methyl and $R^3$ is ethylene.

3. A composition according to claim 2 where the concentration of inhibitor is sufficient to impart long term storage stability at 50° C. without impairing the ability of said composition to cure at 80° C.

4. A composition according to claim 1 where said platinum catalyst inhibitor is $(n-C_4H_9)_2NCH_2CH_2CH_2NH_2$ or $n-C_4H_9NH_2$.

5. A composition according to claim 1 where the concentration of said platinum catalyst inhibitor is from 0.001 to 1.0 part by weight per 100 parts by weight of said composition.

6. A composition according to claim 5 where the concentration of said platinum catalyst inhibitor is from 0.003 to 0.01 part by weight per 100 parts by weight of said composition.

7. A composition according to claim 1 where said organosiloxane copolymer contains from 87 to 94 mol percent of $(CH_3)_2SiO$ units, from 3 to 6 mol percent of $CH_3SiO_{1.5}$ units, from 2.5 to 5 mol percent of $(CH_3)_3SiO_{0.5}$ units and from 0.5 to 1 mol percent of $(CH_3)_2(CH_2=CH)SiO_{0.5}$ units.

8. A composition according to claim 1 where said organohydrogensiloxane is a dimethylhydrogensiloxy endblocked polydimethylsiloxane containing from 1 to 30 dimethylsiloxane units per molecule.

9. A composition according to claim 1 where said platinum catalyst is a reaction product of chloroplatinic acid with an organosilicon compound.

* * * * *